US006943514B1

(12) United States Patent
Chen et al.

(10) Patent No.: US 6,943,514 B1
(45) Date of Patent: Sep. 13, 2005

(54) MOTOR CONTROL CIRCUIT FOR SUPPLYING A CONTROLLABLE DRIVING CURRENT

(75) Inventors: Chi-Yang Chen, Hsin-Chu (TW); Li-Cheng Chen, Kao-Hsiung (TW)

(73) Assignee: Aimtron Technology Corp., Hsinchu (TW)

( * ) Notice: Subject to any disclaimer, the term of this patent is extended or adjusted under 35 U.S.C. 154(b) by 0 days.

(21) Appl. No.: 10/708,986

(22) Filed: Apr. 6, 2004

(51) Int. Cl.$^7$ .............................................. H02P 7/36
(52) U.S. Cl. ...................... 318/439; 318/254; 318/432; 318/434; 318/635; 318/678; 318/681; 363/95; 363/97
(58) Field of Search ................ 318/254, 434, 318/439, 432, 635, 678, 681; 363/95, 97

(56) References Cited

U.S. PATENT DOCUMENTS

| | | | | |
|---|---|---|---|---|
| 3,757,183 A | * | 9/1973 | Nola ........................... | 318/254 |
| 4,066,945 A | * | 1/1978 | Korte, Jr. .................... | 318/681 |
| 4,300,080 A | * | 11/1981 | Lee ............................. | 318/563 |
| 4,710,686 A | * | 12/1987 | Guzik ......................... | 318/293 |
| 5,045,766 A | | 9/1991 | Vermersch .................. | 318/293 |
| 5,153,492 A | * | 10/1992 | Landseadel ................. | 318/599 |
| 5,194,786 A | * | 3/1993 | Smith et al. ................ | 318/254 |
| 5,530,639 A | | 6/1996 | Schulz et al. ................ | 363/17 |
| 5,729,449 A | * | 3/1998 | Takada et al. ............... | 363/98 |
| 5,744,922 A | | 4/1998 | Neary et al. ................ | 318/293 |
| 5,773,991 A | * | 6/1998 | Chen ........................... | 324/772 |
| 6,066,930 A | | 5/2000 | Horiguchi et al. .......... | 318/439 |
| 6,204,729 B1 | | 3/2001 | Takita ......................... | 330/146 |
| 6,667,843 B2 | * | 12/2003 | Norman et al. .............. | 360/67 |

* cited by examiner

*Primary Examiner*—Rita Leykin
(74) *Attorney, Agent, or Firm*—Winston Hsu (57) ABSTRACT

For applying a driving current to a motor, an H-bridge circuit is constructed by a first and a second switching unit and a first and a second linear unit. An error amplifier generates an error signal representative of a difference between the driving current detected by a current detecting circuit and a command current signal. A state control circuit synchronously controls the first and second switching units and a feedback circuit. Through the feedback circuit, the error signal is selectively applied to the first or second linear unit such that one is operated in a linear mode and the other is operated in a nonconductive mode, thereby controlling the driving current to become proportional to the command current signal. The state control circuit further controls a brake circuit for transforming the error signal into a brake signal to operate the first and second linear units simultaneously in a conductive mode.

20 Claims, 4 Drawing Sheets

MOTOR CONTROL CIRCUIT FOR SUPPLYING A CONTROLLABLE DRIVING CURRENT

BACKGROUND OF INVENTION

1. Field of the Invention

The present invention relates to a motor control circuit and, more particularly, to a motor control circuit for supplying a controlling driving current to a motor.

2. Description of the Related Art

Generally speaking, an H-bridge circuit constructed by four switch transistors may supply a driving current to a motor, such as DC motor, stepping motor, voice coil motor, and the like, for controlling a rotating direction, a rate of rotation, and other operational characteristics.

Figure 1:
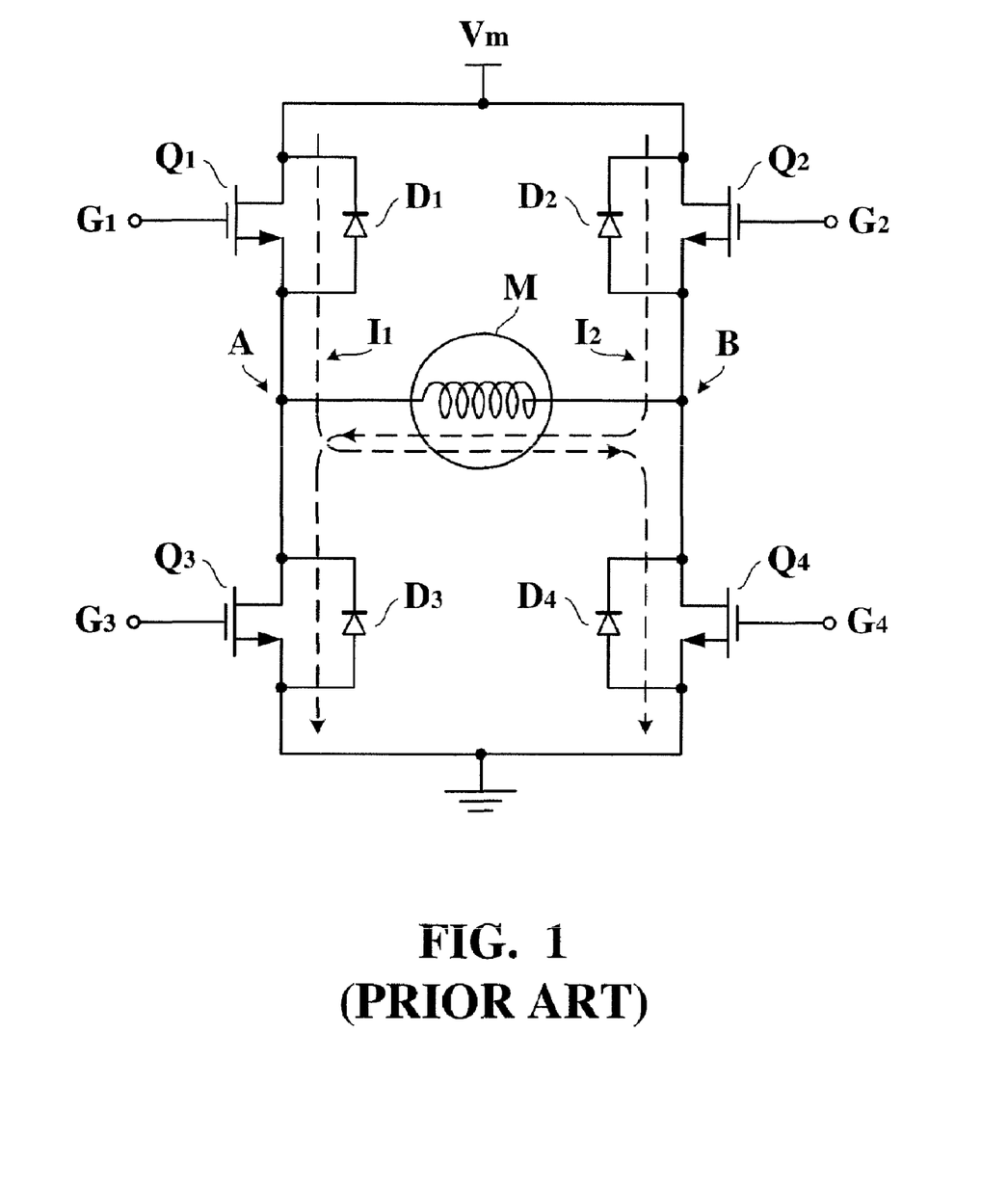
FIG. 1 is a circuit diagram showing a conventional H-bridge circuit for driving a motor.

FIG. 1 is a circuit diagram showing a conventional H-bridge circuit 10 for driving a motor M. Referring to FIG. 1, the motor M is coupled between a supply voltage source $V_m$ and a ground potential through the H-bridge circuit 10. Although the motor M is in practice a complex system consisting of a variety of mechanical and electrical components, the driving current is essentially applied to a winding of the motor M for generating a magnetic field. Consequently, the term "motor" in this specification primarily refers to the winding of the motor M, which may be reduced to an inductive load for a simpler consideration. The drawing also emphasizes this consideration by illustrating the representative winding of the motor M.

The H-bridge circuit 10 includes four N-channel MOSFET transistors (NMOS) $Q_1$ to $Q_4$. The NMOS transistor $Q_1$, has a drain electrode coupled to the supply voltage source $V_m$ and a source electrode coupled to a terminal A of the motor M. The NMOS transistor $Q_2$ has a drain electrode coupled to the supply voltage source $V_m$ and a source electrode coupled to a terminal B of the motor M. The NMOS transistor $Q_3$ has a drain electrode coupled to the terminal A of the motor A and a source electrode coupled to a ground potential. The NMOS transistor $Q_4$ has a drain electrode coupled to the terminal B of the motor M and a source electrode coupled to the ground potential.

Since the NMOS transistors $Q_1$ to $Q_4$ have parasitic diodes $D_1$ to $D_4$, respectively, the H-bridge circuit 10 needs not to be additionally provided with flywheel diodes. If the four switch transistors of the H-bridge circuit 10 are implemented by bipolar junction transistors, however; the diodes $D_1$ to $D_4$ shown in FIG. 1 should be additionally provided.

The gate electrodes of the NMOS transistors $Q_1$ to $Q_4$ are controlled by control signals $G_1$ to $G_4$, respectively. When the control signals $G_1$ and $G_4$ are at a logic high level and the control signals $G_2$ and $G_3$ are at a logic low level, the NMOS transistors $Q_1$ and $Q_4$ are turned on and the NMOS transistors $Q_2$ and $Q_3$ are turned off such that the terminal A is coupled to the supply voltage source $V_m$ through the conductive NMOS transistor $Q_1$ and the terminal B is coupled to the ground potential through the conductive NMOS transistor $Q_4$. As a result, the supply voltage source $V_m$ applies a driving current $I_1$ to flow through the motor in a direction from the terminal A toward the terminal B. When the control signals $G_1$ and $G_4$ are at the logic low level and the control signals $G_2$ and $G_3$ are at the logic high level, the NMOS transistors $Q_1$ and $Q_4$ are turned off and the transistor $Q_2$ and $Q_3$ are turned on such that the terminal B is coupled to the supply voltage source $V_m$ through the conductive NMOS transistor $Q_2$ and the terminal A is coupled to the ground potential through the conductive NMOS transistor $Q_3$. As a result, the supply voltage source $V_m$ applies another driving current $I_2$ to flow through the motor M in another direction from the terminal B toward the terminal A.

Among the various applications of using the motor M, the driving current applied between the terminals A and B determines practical operational characteristics of the motor M and therefore needs to satisfy several requirements of application. At first, a direction and an absolute value of the driving current should belong to a controllable quantity because the direction of the driving current determines a direction of the magnetic field generated by the winding of the motor M and the absolute value of the driving current determines a strength of the magnetic field generated by the motor M. Especially when the motor M needs to be operated in a constant current driving condition, the absolute value of the driving current must be kept constant.

Conventionally, a pulse width modulation (PWM) technique is usually adopted to control the absolute value of the driving current applied to the motor. More specifically, in the situation where the NMOS transistor $Q_4$ is turned on and the NMOS transistors $Q_2$ and $Q_3$ are turned off, the control signal $G_1$ may be implemented by a PWM signal such that the ON time of the NMOS transistor $Q_1$ is determined by the duty cycle of the PWM control signal $G_1$, thereby controlling an average value of the driving current. However, the PWM technique inevitably induces excessive disturbances in the supply voltage source $V_m$ and the driving current applied to the motor M. For the application which requires extremely precise control of the motor, the conventional PWM technique may cause several disadvantageous effects. Therefore, it is desired to provide a control circuit capable of supplying a low noise driving current to the motor M.

SUMMARY OF INVENTION

An object of the present invention is to provide a motor control circuit capable of controlling a direction and an absolute value of the driving current for a motor.

Another object of the present invention is to provide a motor control circuit capable of keeping constant an absolute value of a driving current for a motor.

Still another object of the present invention is to provide a motor control circuit capable of suppressing noise of a driving current for a motor.

According to the present invention, a motor control circuit is provided for supplying a driving current to a motor. The driving current is applied between a first terminal and a second terminal of the motor. The motor control circuit includes: an H-bridge circuit, a current detection circuit, an error amplifier, a feedback circuit, and a state control circuit.

The H-bridge circuit has a first switching unit, a second switching unit, a first linear unit, and a second linear unit. The first switching unit and the first linear unit are together coupled to the first terminal. The second switching unit and the second linear unit are together coupled to the second terminal. The current detection circuit generates a current detection signal representative of the driving current of the motor. The error amplifier generates at least one error signal representative of a difference between the current detection signal and a command current signal. The at least one error signal is electrically separate from the first and the second switching units. The feedback circuit is coupled to the error amplifier for receiving the at least one error signal so as to apply the at least one error signal selectively to the first or the second linear unit. The state control circuit synchronously controls the first and the second switching units and the feedback circuit.

During a first operational period, the first switching unit is operated in a nonconductive mode, the second switching unit is operated in a conductive mode, the feedback circuit allows one of the at least one error signal to be applied to the first linear unit for operating the first linear unit in a linear mode, and the feedback circuit prevents the at least one error signal from being applied to the second linear unit. Therefore, the driving current is controlled to become substantially proportional to the command current signal. At this moment, the driving current flows through the motor in a direction from the second terminal toward the first terminal.

During a second operational period, the first switching unit is operated in the conductive mode, the second switching unit is operated in the nonconductive mode, the feedback circuit prevents the at least one error signal from being applied to the first linear unit, and the feedback circuit allows another of the at least one error signal to be applied to the second linear unit for operating the second linear unit in the linear mode. Therefore, the driving current is controlled to become substantially proportional to the command current signal. At this moment, the driving current flows through the motor in a direction from the first terminal toward the second terminal.

The error amplifier includes a first and a second NMOS transistors, and a first, a second, and a third current mirrors. The first NMOS transistor has a gate electrode controlled by the current detection signal and a source electrode coupled to a constant current source. The second NMOS transistor has a gate electrode controlled by the command current signal and a source electrode coupled to the constant current source. The first current mirror has an original current branch coupled to a drain electrode of the first NMOS transistor. The second current mirror has an original current branch coupled to a drain electrode of the second NMOS transistor. The third current mirror has an original current branch coupled to a mirror current branch of the first current mirror. A first output terminal is coupled to a mirror current branch of the second current mirror and a mirror current branch of the third current mirror, for supplying the one of the at least one error signal.

The second current mirror further has a parallel mirror current branch coupled in parallel with the mirror current branch of the second current mirror. The third current mirror further has a parallel mirror current branch coupled in parallel with the mirror current branch of the third current mirror. The error amplifier further includes a second output terminal coupled to the parallel mirror current branch of the second current mirror and the parallel mirror current branch of the third current mirror, for supplying the another of the at least one error signal.

The feedback circuit includes a first and a second switching means. The first switching means is coupled to the first linear unit and controlled by the state control circuit. During the first operational period, the first switching means allows the one of the at least one error signal to be applied to the first linear unit. During the second operational period, the first switching means prevents the at least one error signal from being applied to the first linear unit. The second switching means is coupled to the second linear unit and controlled by the state control circuit. During the first operational period, the second switching means prevents the at least one error signal from being applied to the second linear unit. During the second operational period, the second switching means allows the another of the at least one error signal to be applied to the second linear unit.

The state control circuit synchronously outputs a first to a fourth state control signals, for controlling the first and the second switching means of the feedback circuit and the first and the second switching units of the H-bridge circuit, respectively. Each of the first to the fourth state control signals is a digital logic signal having a logic high level and a logic low level. During the first operational period, the first and the third state control signals are at the logic low level and the second and the fourth state control signals are at the logic high level. During the second operational period, the first and the third state control signals are at the logic high level and the second and the fourth state control signals are at the logic low level.

The motor control circuit further includes a brake circuit controlled by the state control circuit. During a third operational period, the brake circuit transforms the at least one error signal to become at least one brake signal. The at least one brake signal is applied through the feedback circuit simultaneously to the first and the second linear units for operating the first and the second linear units in the linear mode. During the third operational period, the state control circuit operates the first and the second switching units in the nonconductive mode.

The state control circuit further outputs a brake control signal, which is a digital logic signal having a logic high level and a logic low level. The brake control signal is outputted to the brake circuit for transforming the at least one error signal to become the at least one brake signal. During the third operational period, the first to the fourth state control signals are at the logic low level and the brake control signal is at the logic high level.

BRIEF DESCRIPTION OF DRAWINGS

The above-mentioned and other objects, features, and advantages of the present invention will become apparent with reference to the following descriptions and accompanying drawings, wherein.

DETAILED DESCRIPTION

The preferred embodiments according to the present invention will be described in detail with reference to the drawings.

Figure 2:
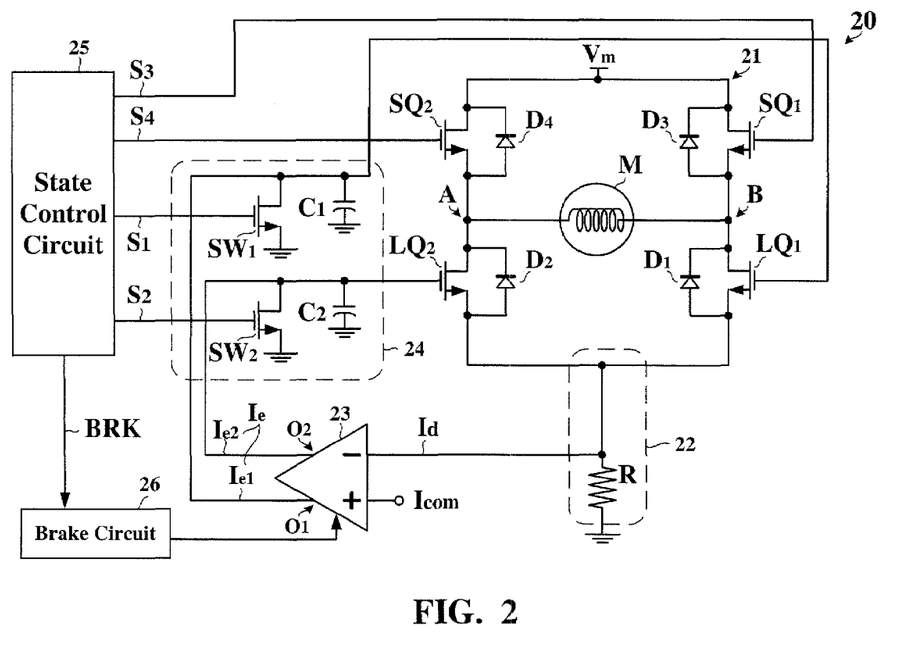
FIG. 2 is a circuit diagram showing an example of a motor control circuit according to the present invention.

FIG. 2 is a circuit diagram showing an example of a motor control circuit 20 according to the present invention. Referring to FIG. 2, the motor control circuit 20 includes an H-bridge circuit 21, a current detection circuit 22, an error amplifier 23, a feedback circuit 24, and a state control circuit 25.

The H-bridge circuit 21 includes two switching units $SQ_1$ and $SQ_2$ and two linear units $LQ_1$ and $LQ_2$ The switching units $SQ_1$ and $SQ_2$ couple a supply voltage source $V_m$ and a motor M while the linear units $LQ_1$ and $LQ_2$ couples the motor M and a ground potential. The switching units $SQ_1$ and $SQ_2$ may be operated in a conductive mode and a nonconductive mode while the linear units $LQ_1$ and $LQ_2$ may be operated in a linear mode in addition to the conductive mode and the nonconductive mode. The term "conductive mode" refers to an operational state in which an equivalent resistance is negligible and therefore considered as a short circuit. The term "nonconductive mode" refers to an operational state in which the equivalent resistance is large enough for being considered as an open circuit. The term "linear mode" refers to an operational state in which the equivalent resistance substantially linearly changes in accordance with a control signal.

The current detection circuit 22 is adopted to detect a driving current for the motor M, i.e. a current applied between terminals A and B of the motor M, and then output to the inverting input terminal (−) of the error amplifier 23 a current detection signal $I_d$ representative of the motor driving current. The non-inverting input terminal (+) of the error amplifier 23 receives a command current signal $I_{com}$ for instructing the motor control circuit 20 according to the present invention to generate a desirable motor driving current. The command current signal $I_{com}$ may be set by users, adjusted according to application requirements, or controlled by other circuit components based on the feedback of operational characteristics of the motor. In the error amplifier 23, the current detection signal $I_d$ is compared with the command current signal $I_{com}$, generating at least one error signal $I_e$ representative of a difference between the current detection signal $I_d$ and the command current signal $I_{com}$.

Based on state control signals $S_1$ and $S_2$ generated by the state control circuit 25, the feedback circuit 24 causes the at least one error signal $I_e$ to be selectively applied to the linear unit $LQ_1$ or $LQ_2$. More specifically, when the state control signals $S_1$ and $S_2$ instructs the feedback circuit 24 that the linear unit $LQ_1$ is to be operated in the linear mode and the linear unit $LQ_2$ is to be operated in the nonconductive mode, the feedback circuit 24 allows the at least one error signal $I_e$ to be applied to the linear unit $LQ_1$ but prevents the at least one error signal $I_e$ from being applied to the linear unit $LQ_2$. In this case, the equivalent resistance of the linear unit $LQ_1$ substantially linearly changes in accordance with the at least one error signal $I_e$. When the state control signals $S_1$ and $S_2$ instructs the feedback circuit 24 that the linear $LQ_1$ is to be operated in the nonconductive mode and the linear unit $LQ_2$ to be operated in the linear mode, the feedback circuit 24 prevents the at least one error signal $I_e$ from being applied to the linear unit $LQ_1$ but allows the at least one error signal $I_e$ to be applied to the linear unit $LQ_2$. In this case, the equivalent resistance of the linear unit $LQ_2$ substantially linearly changes in accordance with the at least one error signal $I_e$.

The state control circuit 25 further generates other two state control signals $S_3$ and $S_4$ for controlling the switching units $SQ_1$ and $SQ_2$ to be operated in either the conductive mode or the nonconductive mode. The state control signals S1 to S4 synchronously generated by the state control circuit 25 are collaborative with respect to each other, thereby achieving the operational state control performed in the motor control circuit 20 according to the present invention.

More specifically, when the state control signal $S_1$ causes the feedback circuit 24 to selectively applies the at least one error signal $I_e$ to the linear unit $LQ_1$, the state control signal $S_4$ operates the switching unit $SQ_2$ in the conductive mode. At this moment, the state control signals $S_2$ and $S_3$ operate the linear unit $LQ_2$ and the switching unit $SQ_1$ in the nonconductive mode, respectively. As a result, the terminal A of the motor M is connected in short circuit to the supply voltage source $V_m$ while the terminal B of the motor M is coupled to the ground potential though the linear unit $LQ_1$ operated in the linear mode and the current detection circuit 22. In this case, the driving current flows through the motor M in a direction from the terminal A toward the terminal B, and is detected by the current detection circuit 22. As described above, the variation of the motor driving current is fed back to the linear unit $LQ_1$ through a loop constructed by the current detection circuit 22, the error amplifier 23, and the feedback circuit 24, causing the equivalent resistance of the linear unit $LQ_1$ to correspondingly change for controlling the motor driving current to become substantially proportional to the command current signal $I_{com}$.

On the other hand, when the state control signal $S_2$ causes the feedback circuit 24 to selectively apply the at least one error signal $I_e$ to the linear unit $LQ_2$, the state control signal $S_3$ operates the switching unit $SQ_1$ in the conductive mode. At this moment, the state control signals $S_1$ and $S_4$ operate the linear unit $LQ_1$ and the switching unit $SQ_2$ in the nonconductive mode, respectively. As a result, the terminal B of the motor M is connected in short circuit to the supply voltage source $V_m$ while the terminal A of the motor M is coupled to the ground potential though the linear unit $LQ_2$ operated in the linear mode and the current detection circuit 22. In this case, the driving current flows through the motor M in a direction from the terminal B toward the terminal A, and is detected by the current detection circuit 22. As described above, the variation of the motor driving current is fed back to the linear unit $LQ_2$ through a loop constructed by the current detection circuit 22, the error amplifier 23, and the feedback circuit 24, causing the equivalent resistance of the linear unit $LQ_2$ to correspondingly change for controlling the motor driving current to become substantially proportional to the command current signal $I_{com}$.

Therefore, the motor control circuit 20 according to the present invention is able to control the direction and absolute value of the driving current for the motor. If the command current signal $I_{com}$ is set as a constant, the motor control circuit 20 according to the present invention is able to keep constant the absolute value of the driving current for the motor. Because the motor control circuit 20 according to the present invention utilizes the linear modes of the linear units $LQ_1$ and $LQ_2$ to achieve the desired motor driving current, the noise of the driving current is effectively suppressed.

It should be noted that in the motor control circuit 20 according to the present invention, the switching units $SQ_1$ and $SQ_2$ are controlled by the state control signals $S_3$ and $S_4$ generated by the state control circuit 25, instead of the at least one error signal $I_e$. Particularly, the at least one error signal $I_e$ is electrically separate from the switching units $SQ_1$ and $SQ_2$. As a primary function, the at least one error signal $I_e$ is selectively fed back to operate the linear unit $LQ_1$ or $LQ_2$ in the linear mode.

In the embodiment shown in FIG. 2, the switching units $SQ_1$ and $SQ_2$ may be implemented by NMOS transistors. The switching unit $SQ_1$ has a drain electrode coupled to the supply voltage source $V_m$ and a source electrode coupled to the terminal B of the motor M. The switching unit $SQ_2$ has a drain electrode coupled to the supply voltage source $V_m$ and a source electrode coupled to the terminal A of the motor M. The linear units $LQ_1$ and $LQ_2$ may be implemented by NMOS transistors. The linear unit $LQ_1$ has a drain electrode coupled to the terminal B of the motor M and a source electrode coupled to the ground potential. The linear unit $LQ_2$ has a drain electrode coupled to the terminal A of the motor M and a source electrode coupled to the ground potential.

It should be noted that the H-bridge circuit 21 shown in FIG. 2 needs not to be additionally provided with flywheel diodes since the NMOS transistors have parasitic diodes $D_1$ to $D_4$. If the switching units $SQ_1$ and $SQ_2$ and the linear units LQ$_1$ and LQ$_2$ of the H-bridge circuit 21 are implemented by bipolar junction transistors, however; the diodes D$_1$ to D$_4$ shown in FIG. 2 must be additionally provided.

The current detection circuit 22 may be implemented by a resistor R. One terminal of the resistor R is coupled to the linear unit LQ$_1$ and LQ$_2$, and the other terminal is coupled to the ground potential. Therefore, a potential difference produced by the driving current flowing through the resistor R may serve as the current detection signal I$_d$, indicative of the absolute value of the motor driving current.

It should be noted that although in the embodiment shown in FIG. 2 the current detection circuit 22 detects the driving current flowing through the motor in an indirect way of detecting the current flowing from the terminal A or B of the motor M to the ground potential, the present invention is not limited to this and may be applied to a case that the current detection circuit 22 directly detects the driving current flowing through the motor M. More specifically, the current detection circuit 22 may be provided at the terminal A or B of the motor as a series connected resistor, for example, such that the driving current flowing between the terminals A and B flows through not only the motor M but also the current detection circuit 22.

The error amplifier 23 has two identical output terminals O$_1$ and O$_2$ for generating two identical error signals V$_{e1}$ and V$_{e2}$ as the at least one error signal I$_e$. The output terminal O$_1$ is coupled to the linear unit LQ$_1$ while the output terminal O$_2$ is coupled to the linear unit LQ$_2$ The feedback circuit 24 is provided with two switching means SW$_1$ and SW$_2$. The switching means SW$_1$ is controlled by the state control signal S$_1$. When the switching means SW$_1$ is turned on, the output terminal O$_1$ is connected in short circuit to the ground potential, preventing the error signal I$_{e1}$ from being applied to the linear unit LQ$_1$ and causing the linear unit LQ$_1$ to be operated in the nonconductive mode. When the switching means SW$_1$ is turned off, the error signal I$_{e1}$ is applied to the linear unit LQ$_1$ for operating the linear unit LQ$_1$ in the linear mode. The switching means SW$_2$ is controlled by the state control signal S$_2$. When the switching means SW$_2$ is turned on, the output terminal O$_2$ is connected in short circuit to the ground potential, preventing the error signal I$_{e2}$ from being applied to the linear unit LQ$_2$ and causing the linear unit LQ$_2$ to be operated in the nonconductive mode. When the switching means SW$_2$ is turned off, the error signal I$_{e2}$ is applied to the linear unit LQ$_2$ for operating the linear unit LQ$_2$ in the linear mode.

it should be noted that although in the embodiment shown in FIG. 2 the feedback circuit 24, under the control of the state control circuit 25, independently determines whether the error signal I$_{e1}$ is applied to or not to the linear unit LQ$_1$ and independently determines whether the error signal I$_{e2}$ is applied to or not to the linear unit LQ$_2$, the present invention is not limited to this and may be applied to a case that the error amplifier 23 is provided with only one output terminal for generating a single error signal I$_e$. In this case, the feedback circuit 24 under the control of the state control circuit 25 causes the single output terminal of the error amplifier 23 to be selectively coupled to the linear unit LQ$_1$ or LQ$_2$, thereby achieve selectively applying the single error signal I$_e$ to the linear unit LQ$_1$ or LQ$_2$.

Since the linear units LQ$_1$ and LQ$_2$ of the H-bridge circuit 21 are operated in the linear mode, instead of being switched on and off with a high frequency according to the prior art PWM technique, the motor control circuit 20 according to the present invention avoids the induction of excessive disturbances and therefore effectively suppresses the noise of the motor driving current. If a greater degree of suppression to the noise of the motor driving current is desired, the feedback circuit 24 may further be provided with capacitors C$_1$ and C$_2$. The capacitor C$_1$ is coupled between the gate electrode of the linear unit LQ$_1$ and the ground potential such that the error signal I$_{e1}$ is relatively gradually applied to the gate electrode of the linear unit LQ$_1$. The capacitor C$_2$ is coupled between the gate electrode of the linear unit LQ$_2$ and the ground potential such that the error signal I$_{e2}$ is relatively gradually applied to the gate electrode of the linear unit LQ$_2$.

The motor control circuit 20 according to the present invention is further provided with a brake circuit 26 for simultaneously operating the linear units LQ$_1$ and LQ$_2$ in the conductive mode. More specifically, when the motor control circuit 20 performs the brake control, the state control circuit 25 outputs a brake control signal BRK to the brake circuit 26. In response to the brake control signal BRK, the brake circuit 26 transforms the at least one error signal I$_e$ generated by the error amplifier 23 to become at least one brake signal. Under the control of the state control circuit 25, the switching units SQ$_1$ and SQ$_2$ are operated in the nonconductive mode, and the feedback circuit 24 simultaneously applies the at least one brake signal to the linear units LQ$_1$ and LQ$_2$ for operating the linear units LQ$_1$ and LQ$_2$ in the conductive mode.

More specifically, in the embodiment shown in FIG. 2, the brake circuit 26 in response to the brake control signal BRK causes the two inverting input terminals of the error amplifier 23 to be connected in short circuit to the ground potential or held at a potential lower than the command current signal I$_{com}$. As a result, the error signals I$_{e1}$ and I$_{e2}$ are transformed to become the brake signals having the logic high level, not any more the above-described linear signals for the feedback control. In this case, the state control circuit 25 simultaneously turns off the switching means SW$_1$ and SW$_2$ through the state control signals S1 and S$_2$ such that the brake signals I$_{e1}$ and I$_{e2}$ having the logic high level are input to the gate electrodes of the linear units LQ$_1$ and LQ$_2$, respectively. The brake signals I$_{e1}$ and I$_{e2}$ having the logic high level operate the linear units LQ$_1$ and LQ$_2$ in the conductive mode, achieving the desired brake control.

In the brake control, for more rapidly transforming the error signals I$_{e1}$ and I$_{e2}$ to become the brake signals having the logic high level, the brake circuit 26 may be additionally provided with means for directly controlling the output stages of the error amplifier 23 so as to force the two output terminals O$_1$ and O$_2$ to rapidly output the brake signals I$_{e1}$ and I$_{e2}$ having the logic high level.

Figure 3:
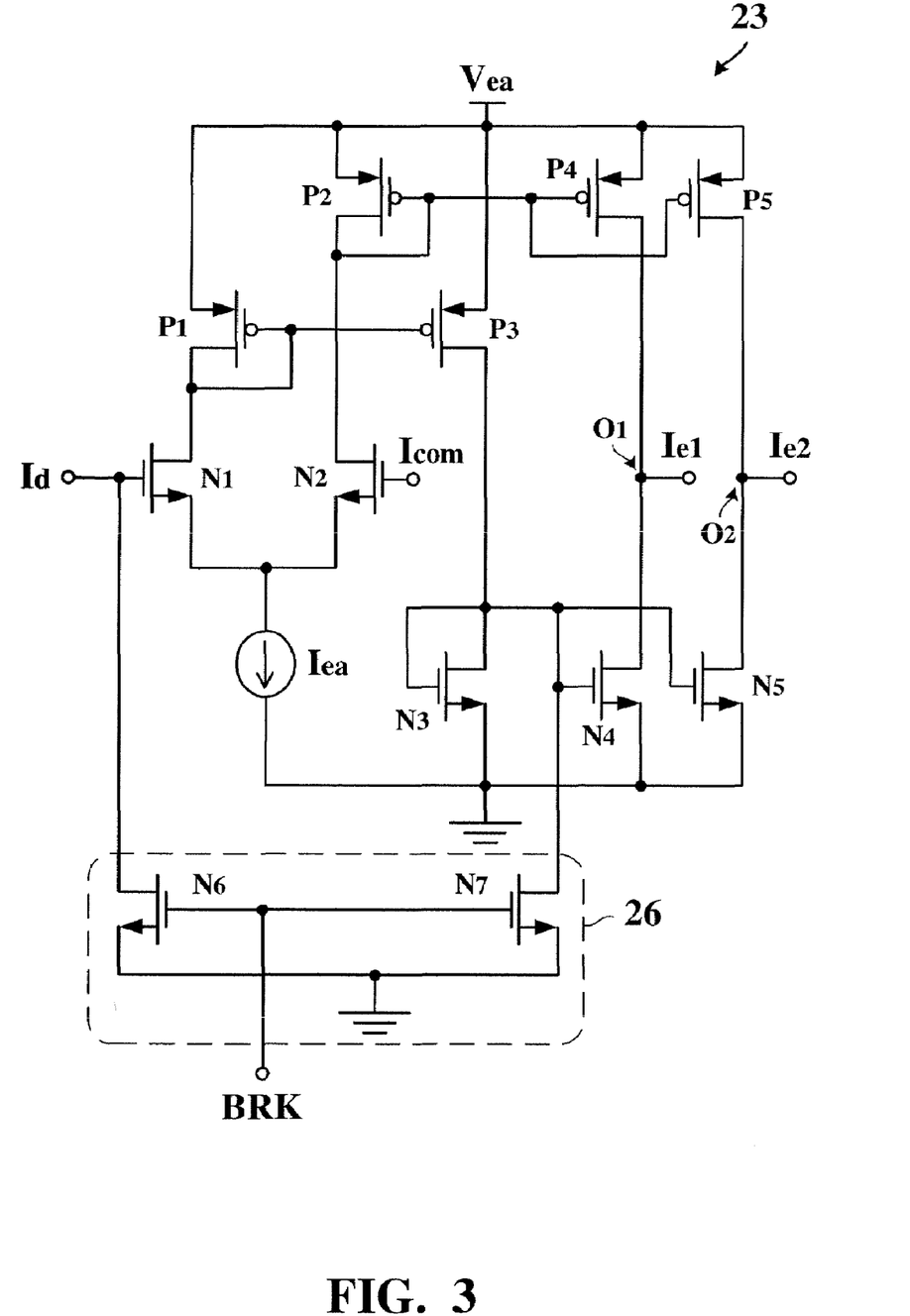
FIG. 3 is a detailed circuit diagram showing an example of an error amplifier and a brake circuit according to the present invention.

FIG. 3 is a detailed circuit diagram showing an example of the error amplifier 23 and the brake circuit 26 according to the present invention. First of all is described the detailed circuit of one example of the error amplifier 23 according to the present invention. An NMOS transistor N$_1$ has a gate electrode for receiving the current detection signal I$_d$ while an NMOS transistor N$_2$ has a gate electrode for receiving the command current signal I$_{com}$. Each of the NMOS transistors N$_1$ and N$_2$ has a source electrode coupled to a constant current source I$_{ea}$. The current detection signal I$_d$ and the command current signal I$_{com}$ determines a ratio of the current flowing through the NMOS transistors N$_1$ to the current flowing through the NMOS transistor N$_2$, on which a differential distribution of the constant current source I$_{ea}$ depends.

PMOS transistors P$_1$ and P$_3$ form a current mirror in which the PMOS transistor P$_1$ serves as an original current branch and the PMOS transistor P$_3$ serves as a mirror current branch. The PMOS transistor $P_1$ is coupled to the NMOS transistor $N_1$ such that the current flowing through the PMOS transistor $P_3$ corresponds in accordance with the mirror effect to the current flowing through the NMOS transistor $N_1$, for being representative of the current detection signal $I_d$. PMOS transistors $P_2$ and $P_4$ form another current mirror in which the PMOS transistor $P_2$ serves as an original current branch and the PMOS transistor $P_4$ serves as a mirror current branch. The PMOS transistor $P_2$ is coupled to the NMOS transistor $N_2$ such that the current flowing through the PMOS transistor $P_4$ corresponds in accordance with the mirror effect to the current flowing through the NMOS transistor $N_2$, for being representative of the command current signal $I_{com}$.

NMOS transistors $N_3$ and $N_4$ form still another current mirror in which the NMOS transistor $N_3$ serves as an original current branch and the NMOS transistor $N_4$ serves as a mirror current branch. The NMOS transistor $N_3$ is coupled to the PMOS transistor $P_3$ such that the current flowing through the NMOS transistor $N_4$ corresponds in accordance with the mirror effect to the current flowing through the NMOS transistor $N_1$, for being representative of the current detection signal $I_d$.

The output terminal $O_1$ of the error amplifier 23 is coupled to the PMOS transistor $P_4$ and the NMOS transistor N. When the current detection signal $I_d$ is lower than the command current signal $I_{com}$, the current flowing through the PMOS transistor $P_4$ is higher than the current flowing through the NMOS transistor $N_4$, resulting in that a differential current flows out of the output terminal $O_1$ for current equivalence. When the current detection signal $I_d$ is higher than the command current signal $I_{com}$, the current flowing through the PMOS transistor $P_4$ is lower than the current flowing through the NMOS transistor $N_4$, resulting in that a differential current sinks in the output terminal $O_1$ for current equivalence. Therefore, the error signal $I_{e1}$ may be implemented by this differential current.

PMOS transistor $P_5$ is coupled in parallel with the PMOS transistor $P_4$ for serving as a parallel mirror current branch such that the current flowing through the PMOS transistor $P_5$ is also representative of the command current signal $I_{com}$. NMOS transistor $N_5$ is coupled in parallel with the NMOS transistor $N_4$ for serving as a parallel mirror current branch such that the current flowing through the NMOS transistor $N_5$ is also representative of the current detection signal $I_d$.

The output terminal $O_2$ of the error amplifier 23 is coupled to the PMOS transistor $P_5$ and the NMOS transistor N. When the current detection signal $I_d$ is lower than the command current signal $I_{com}$, the current flowing through the PMOS transistor $P_5$ is higher than the NMOS transistor $N_5$, resulting in that a differential current flows out of the output terminal $O_2$. When the current detection signal $I_d$ is higher than the command current signal $I_{com}$, the current flowing through the PMOS transistor $P_5$ is lower than the NMOS transistor $N_5$, resulting in that a differential current sinks in the output terminal $O_2$. Therefore, the error signal $I_{e2}$ may be implemented by this differential current.

The brake circuit 26 includes NMOS transistors $N_6$, which has a drain electrode coupled to the gate electrode of the NMOS transistor $N_1$ and has a source electrode coupled to the ground potential. A gate electrode of the NMOS transistor $N_6$ is controlled by the brake control signal BRK. When the brake control signal BRK is at the logic high level, the NMOS transistor $N_6$ is turned on, connecting the gate electrode of the NMOS transistor $N_1$ in short circuit to the ground potential. As a result, the error signals $I_{e1}$ and $I_{e2}$ generated by the error amplifier 23 are transformed to become the brake signals having the logic high level. For more rapidly transforming the error signals $I_{e1}$ and $I_{e2}$ to become the brake signals having the logic high level, the brake circuit 26 is further provided with NMOS transistor $N_7$ which has a drain electrode coupled to the gate electrode of the NMOS transistor $N_4$ of the first output stage and the gate electrode of the NMOS transistor $N_5$ of the second output stage and has a source electrode coupled to the ground potential. A gate electrode of the NMOS transistor $N_7$ is controlled by the brake control signal BRK. When the brake control signal BRK is at the logic high level, the NMOS transistor $N_7$ is turned on such that the gate electrodes of the NMOS transistors $N_4$ and $N_5$ are connected in short circuit to the ground potential and then immediately become nonconductive. As a result, the error signals $I_{e1}$ and $I_{e2}$ generated by the error amplifier 23 are rapidly transformed to become the brake signals having the logic high level.

For more clearly understanding the operations of the motor control circuit 20 according to the present invention, hereinafter are exemplarily described with reference to FIG. 4 three operational situations: (1) a constant current driving operation for flowing a current through the motor M from the terminal A toward the terminal B, (2) a braking operation, and (3) a constant current driving operation for flowing a current through the motor M from the terminal B toward the terminal A.

Figure 4:
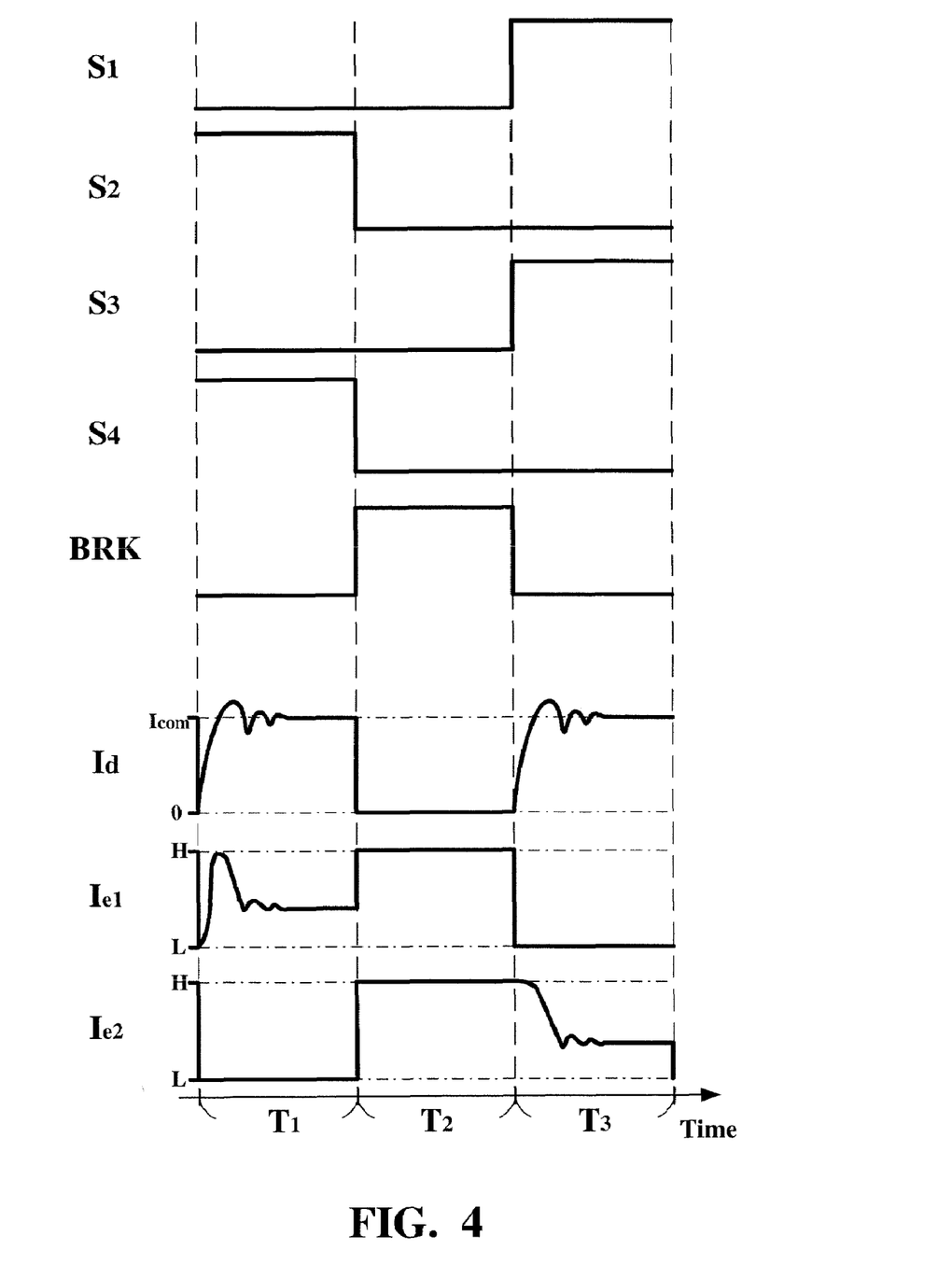
FIG. 4 is a timing chart showing three operational states of a motor control circuit according to the present invention.

As shown in FIG. 4, during an operational period $T_1$, the state control signals $S_1$ and $S_3$ are at the logic low level, the state control signals $S_2$ and $S_4$ are at the logic high level, and the brake control signal BRK are at the logic low level. Consequently, the switching means $SW_1$ and the switching unit $SQ_1$ are turned off, the switching means $SW_2$ and the switching unit $SQ_2$ are turned on, and the brake circuit 26 is at the disable state. The current detection circuit 22 outputs the current detection signal $I_d$, representative of the driving current flowing through the motor M. The error signal $I_{e1}$ is a linear signal, which locates in the linear region between the logic high level H and the logic low level L and operates the linear unit $LQ_1$ in the linear mode through the feedback control. The error signal $I_{e2}$ is pulled down to the ground potential due to the conductive switching means $SW_2$. As a result, the current detection signal $I_d$ after a transient oscillation is kept substantially equal to the command current signal $I_{com}$. In other words, the driving current flowing through the motor M is kept substantially proportional to the command current signal $I_{com}$. Therefore, when the command current signal $I_{com}$ is a constant, the motor control circuit 20 according to the present invention effectively achieves the constant current driving operation for flowing a constant current through the motor M from the terminal A toward the terminal B.

During an operational period $T_2$, the state control signals $S_1$ to $S_4$ are at the logic low level and the brake control signal BRK is at the logic high level. Consequently, the switching means $SW_1$ and $SW_2$ and the switching units $SQ_1$ and $SQ_2$ are turned off. The brake circuit 26 transforms the error signals $I_{e1}$ and $I_{e2}$ to become the brake signals having the logic high level H. The brake signals $I_{e1}$ and $I_{e2}$ having the logic high level H simultaneously operate the linear units $LQ_1$ and $LQ_2$ in the linear mode. Therefore, the motor control circuit 20 according to the present invention effectively achieves the braking operation. Incidentally speaking, the terminals A and B of the motor M at this moment are connected in short circuit to the ground potential, so the driving current flows only in the loop constructed by the conductive linear units $LQ_1$ and $LQ_2$ and the motor M. As a result, the current detection signal $I_d$ is reduced to substantially zero because the driving current does not flow through the current detection circuit 22.

During an operational period $T_3$, the state control signals $S_1$ and $S_3$ are at the logic high level, the state control signals $S_2$ and $S_4$ are at the logic low level, and the brake control signal BRK is at the logic low level. Consequently, the switching means $SW_1$ and the switching unit $SQ_1$ are turned on, the switching means $SW_2$ and the switching unit $SQ_2$ are turned off, and the brake circuit 26 is at the disable state. The current detection circuit 22 outputs the current detection signal $I_d$, representative of the driving current flowing through the motor M. The error signal $I_{e1}$ is pulled down to the ground potential due to the conductive switching means $SW_1$. The error signal $I_{e2}$ is a linear signal, which locates in the linear region between the logic high level H and the logic low level L and operates the linear unit $LQ_2$ in the linear mode through the feedback control. As a result, the current detection signal $I_d$ after a transient oscillation is kept substantially equal to the command current signal $I_{com}$. In other words, the driving current flowing through the motor M is kept substantially proportional to the command current signal $I_{com}$. Therefore, when the command current signal $I_{com}$ is a constant, the motor control circuit 20 according to the present invention effectively achieves the constant current driving operation for flowing a constant current through the motor M from the terminal B to the terminal A.

It should be noted that although in the embodiment shown in FIG. 2 the switching units $SQ_1$ and $SQ_2$ are coupled between the supply voltage source $V_m$ and the motor M and the linear units $LQ_1$ and $LQ_2$ are coupled between the motor M and the ground potential, the present invention is not limited to this and may be applied to a case that the switching units $SQ_1$ and $SQ_2$ are coupled between the motor M and the ground potential and the linear units $LQ_1$ and $LQ_2$ are coupled between the supply voltage source $V_m$ and the motor M. In this case, the terminals A and B of the motor M are connected in short circuit to the ground potential, respectively, when the switching units $SQ_1$ and $SQ_2$ are turned on. Under the feedback control, the linear units $LQ_1$ and $LQ_2$ provide the equivalent resistances between the terminals A and B of the motor M and the supply voltage source $V_m$, respectively.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A motor control circuit for supplying a driving current to a motor, the motor having a first terminal and a second terminal, the driving current being applied between the first and the second terminals, the motor control circuit comprising:

an H-bridge circuit having a first switching unit, a second switching unit, a first linear unit, and a second linear unit, the first switching unit and the first linear unit being together coupled to the first terminal and the second switching unit and the second linear unit being together coupled to the second terminal;

a current detection circuit for generating a current detection signal representative of the driving current of the motor;

an error amplifier for generating at least one error signal representative of a difference between the current detection signal and a command current signal, the at least one error signal being electrically separate from the first and the second switching units;

a feedback circuit coupled to the error amplifier for receiving the at least one error signal so as to apply the at least one error signal selectively to the first or the second linear unit; and a state control circuit for synchronously controlling the first and the second switching units and the feedback circuit such that during a first operational period the first switching unit is operated in a nonconductive mode, the second switching unit is operated in a conductive mode, the feedback circuit allows one of the at least one error signal to be applied to the first linear unit for operating the first linear unit in a linear mode, and the feedback circuit prevents the at least one error signal from being applied to the second linear unit, thereby controlling the driving current to become substantially proportional to the command current signal.

2. The motor control circuit according to claim 1, wherein:

the error amplifier includes:

a first NMOS transistor having a gate electrode, a drain electrode, and a source electrode, the gate electrode being controlled by the current detection signal and the source electrode being coupled to a constant current source;

a second NMOS transistor having a gate electrode, a drain electrode, and a source electrode, the gate electrode being controlled by the command current signal and the source electrode being coupled to the constant current source;

a first current mirror having an original current branch and a mirror current branch, the original current branch being coupled to the drain electrode of the first NMOS transistor;

a second current mirror having an original current branch and a mirror current branch, the original current branch being coupled to the drain electrode of the second NMOS transistor;

a third current mirror having an original current branch and a mirror current branch, the original current branch being coupled to the mirror current branch of the first current mirror; and a first output terminal coupled to the mirror current branch of the second current mirror and the mirror current branch of the third current mirror for supplying the one of the at least one error signal.

3. The motor control circuit according to claim 2, wherein:

the original current branch of the first current mirror is implemented by a first PMOS transistor having a gate electrode, a drain electrode, and a source electrode, the gate electrode being coupled to the drain electrode, the drain electrode being coupled to the drain electrode of the first NMOS transistor, and the source electrode being coupled to a constant voltage source;

the original current branch of the second current mirror is implemented by a second PMOS transistor having a gate electrode, a drain electrode, and a source electrode, the gate electrode being coupled to the drain electrode, the drain electrode being coupled to the drain electrode of the second NMOS transistor, and the source electrode being coupled to the constant voltage source;

the mirror current branch of the first current mirror is implemented by a third PMOS transistor having a gate electrode, a drain electrode, and a source electrode, the gate electrode being coupled to the gate electrode of the original current branch of the first current mirror, the drain electrode being coupled to the original current branch of the third current mirror, and the source electrode being coupled to the constant voltage source; and the mirror current branch of the second current mirror is implemented by a fourth PMOS transistor having a gate electrode, a drain electrode, and a source electrode, the gate electrode being coupled to the gate electrode of the original current branch of the second current mirror, the drain electrode being coupled to the first output terminal of the error amplifier, and the source electrode being coupled to the constant voltage source.

4. The motor control circuit according to claim 2, wherein:

the original current branch of the third current mirror is implemented by a third NMOS transistor having a gate electrode, a drain electrode, and a source electrode, the gate electrode being coupled to the drain electrode, the drain electrode being coupled to the mirror current branch of the first current mirror, and the source electrode being coupled to a ground potential, and the mirror current branch of the third current mirror is implemented by a fourth NMOS transistor having a gate electrode, a drain electrode, and a source electrode, the gate electrode being coupled to the gate electrode of the third NMOS transistor, the drain electrode being coupled to the mirror current branch of the second current mirror, and the source electrode being coupled to the ground potential.

5. The motor control circuit according to claim 1, wherein:

during the first operational period, the driving current flows through the motor in a direction from the second terminal toward the first terminal.

6. The motor control circuit according to claim 1, wherein:

the first and the second switching units are further coupled to a supply voltage source, and the first and the second linear units are further coupled to a ground potential.

7. The motor control circuit according to claim 1, wherein:

the current detection circuit is implemented by a resistor having two terminals, one being coupled to the first and the second linear units and the other being coupled to the ground potential such that the driving current produces a potential difference across the resistor, the potential difference serving as the current detection signal.

8. The motor control circuit according to claim 1, wherein:

the feedback circuit includes:

a first switching means coupled to the first linear unit and controlled by the state control circuit for allowing the one of the at least one error signal to be applied to the first linear unit during the first operational period, and a second switching means coupled to the second linear unit and controlled by the state control circuit for preventing the at least one error signal from being applied to the second linear unit during the first operational period.

9. The motor control circuit according to claim 1, wherein:

the feedback circuit includes:

a first capacitor coupled to the first linear unit for causing the one of the at least one error signal to be relatively gradually applied to the first linear unit during the first operational period.

10. The motor control circuit according to claim 1, wherein:

the state control circuit synchronously outputs a first, a second, a third, and a fourth state control signals, for controlling the feedback circuit and the first and the second switching units of the H-bridge circuit, respectively, each of the first to the fourth state control signals being a digital logic signal having a logic high level and a logic low level, and during the first operational period, the first and the third state control signals are at the logic low level and the second and the fourth state control signals are at the logic high level.

11. The motor control circuit according to claim 1, wherein:

the state control circuit further synchronously controls the first and the second switching units and the feedback circuit such that during a second operational period the first switching unit is operated in the conductive mode, the second switching unit is operated in the nonconductive mode, the feedback circuit prevents the at least one error signal from being applied to the first linear unit, and the feedback circuit allows another of the at least one error signal to be applied to the second linear unit for operating the second linear unit in the linear mode, thereby controlling the driving current to become substantially proportional to the command current signal.

12. The motor control circuit according to claim 11, wherein:

the second current mirror further has a parallel mirror current branch coupled in parallel with the mirror current branch of the second current mirror;

the third current mirror further has a parallel mirror current branch coupled in parallel with the mirror current branch of the third current mirror; and the error amplifier further includes a second output terminal coupled to the parallel mirror current branch of the second current mirror and the parallel mirror current branch of the third current mirror, for supplying the another of the at least one error signal.

13. The motor control circuit according to claim 11, wherein:

during the second operational period, the driving current flows through the motor in a direction from the first terminal toward the second terminal.

14. The motor control circuit according to claim 11, wherein:

the feedback circuit includes:

a first switching means coupled to the first linear unit and controlled by the state control circuit, for allowing the one of the at least one error signal to be applied to the first linear unit during the first operational period and for preventing the at least one error signal from being applied to the first linear unit during the second operational period, and a second switching means coupled to the second linear unit and controlled by the state control circuit, for preventing the at least one error signal from being applied to the second linear unit during the first operational period and for allowing the another of the at least one error signal to be applied to the second linear unit during the second operational period.

15. The motor control circuit according to claim 11, wherein:
the feedback circuit includes:
a first capacitor coupled to the first linear unit for causing the one of the at least one error signal to be relatively gradually applied to the first linear unit during the first operational period, and
a second capacitor coupled to the second linear unit for causing the another of the at least one error signal to be relatively gradually applied to the second linear unit during the second operational period.

16. The motor control circuit according to claim 11, wherein:
the state control circuit synchronously outputs a first, a second, a third, and a fourth state control signals, for controlling the feedback circuit and the first and the second switching units of the H-bridge circuit, respectively, each of the first to fourth state control signals being a digital logic signal having a logic high level and a logic low level, such that:
during the first operational period, the first and the third state control signals are at the logic low level and the second and the fourth state control signals are at the logic high level, and
during the second operational period, the first and the third state control signals are at the logic high level and the second and the fourth state control signals are at the logic low level.

17. The motor control circuit according to claim 1, further comprising:
a brake circuit controlled by the state control circuit such that during a third operational period the brake circuit transforms the at least one error signal to become at least one brake signal for being simultaneously applied to the first and the second linear units through the feedback circuit to operate the first and the second linear units in the conductive mode, and
during the third operational period, the state control circuit operates the first and the second switching units in the nonconductive mode.

18. The motor control circuit according to claim 17, wherein:
the error amplifier has an inverting input terminal for receiving the current detection signal, respectively, and a non-inverting input terminal for receiving the command current signal, and
during the third operational period, the brake circuit connects the inverting input terminal in short circuit to the ground potential such that the at least one error signal is transformed to become the at least one brake signal.

19. The motor control circuit according to claim 18, wherein:
the error amplifier further has at least one output terminal for outputting the at least one error signal, respectively, and
during the third operational period, the brake circuit causes the at least one output terminal to rapidly transform the at least one error signal to become the at least one brake signal.

20. The motor control circuit according to claim 17, wherein:
the state control circuit synchronously outputs a first, a second, a third, a fourth state control signals, and a brake control signal, the first to the fourth state control signals being used to control the feedback circuit and the first and the second switching units of the H-bridge circuit, respectively, and the brake control signal being applied to the brake circuit such that the brake circuit transforms the at least one error signal to become the at least one brake signal, each of the first to the fourth state control signals and the brake control signal being a digital logic signal having a logic high level and a logic low level, such that:
during the first operational period, the first and the third state control signals are at the logic low level, the second and the fourth state control signals are at the logic high level, and the brake control signal is at the logic low level, and
during the third operational period, the first to the fourth state control signals are at the logic low level and the brake control signal is at the logic high level.

* * * * *